Nov. 15, 1960  P. A. MARSAL ET AL  2,960,558
DRY CELL
Filed Oct. 9, 1957  2 Sheets-Sheet 1

INVENTORS
PAUL A. MARSAL
KARL KORDESCH
LEWIS F. URRY

BY John F. Hohmann
ATTORNEY

Nov. 15, 1960     P. A. MARSAL ET AL     2,960,558
DRY CELL
Filed Oct. 9, 1957                    2 Sheets-Sheet 2
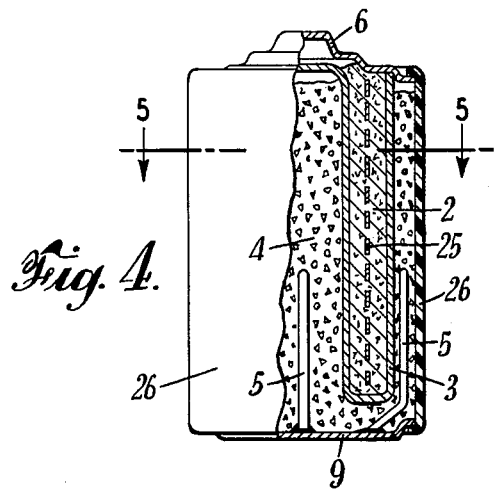
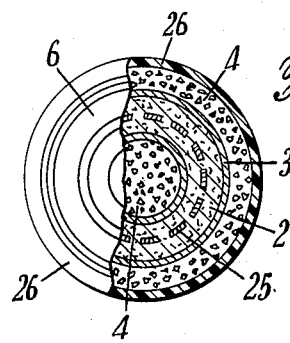
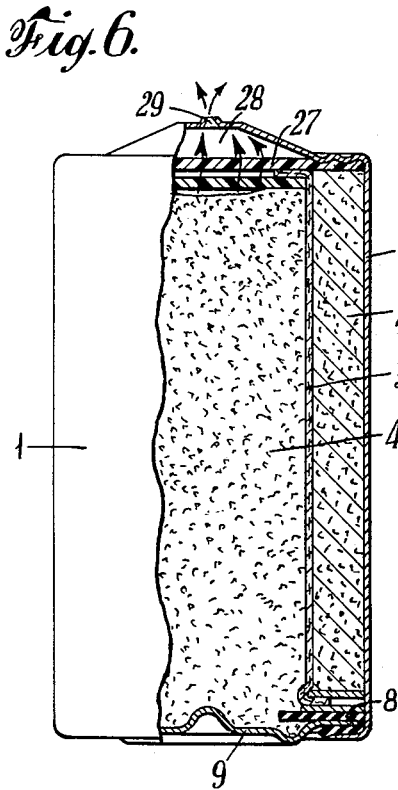
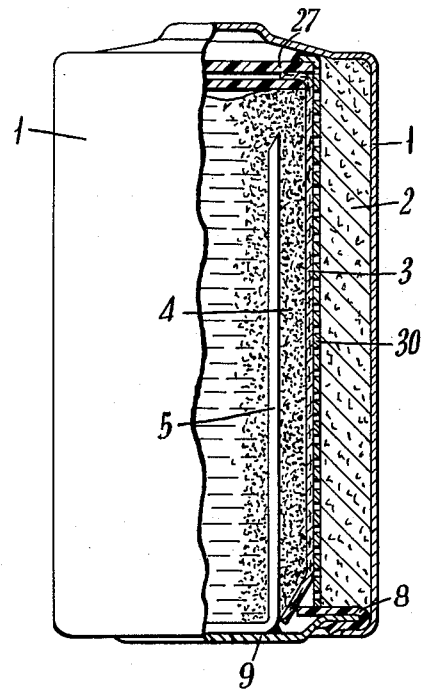
INVENTORS
PAUL A. MARSAL
KARL KORDESCH
LEWIS F. URRY
BY *John F. Hohmann*
ATTORNEY United States Patent Office  2,960,558
Patented Nov. 15, 1960

2,960,558
DRY CELL

Paul A. Marsal, Rocky River, Karl Kordesch, Lakewood, and Lewis F. Urry, Parma, Ohio, assignors to Union Carbide Corporation, a corporation of New York Filed Oct. 9, 1957, Ser. No. 689,084

7 Claims. (Cl. 136—107)

This invention relates to primary cells, and more particularly, to dry cells containing an alkaline electrolyte and a depolarizer consisting of manganese dioxide.

The main object of this invention is to provide novel primary cell constructions capable of outperforming conventional Le Clanche-type cells under practically all operating conditions.

A further object of this invention is to provide a cell system having improved characteristics owing to the incorporation therein of means for improving ionic and electronic migration.

A further object of the invention is to provide a cell of the type described, which cell is particularly efficient under heavy continuous drains.

Another object of the present invention is the provision of a novel cell system having flash current and potential maintenance of 80 percent and 95 percent, respectively, after one year of storage.

These and other related objects and advantages of the present invention will become apparent as the description thereof proceeds, particularly when taken in conjunction with the accompanying drawing wherein:

Fig. 4 is similar to Figs. 1 and 2, but shows a modification of the invention;

Fig. 5 is a bottom view of the cell of Fig. 3;

Fig. 6 is similar to Figs. 1, 2 and 3, but shows additionally improved venting means for the cell of the invention; and Fig. 7 is a front elevation, partly in section, of another embodiment of the present invention.

In the above drawings the same reference characters identify the same or like parts.

Figure 1:
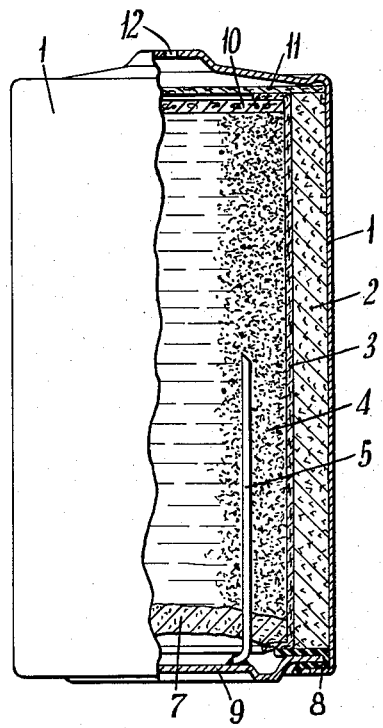
Fig. 1 is a front elevational view, partly in section, of a cell in accordance with the invention.

The cell of the invention consists of an electron producing zinc anode, an ion carrying caustic electrolyte, and a hydroxyl ion-producing manganese dioxide cathode.

The reactions, which are believed to take place in the cell of the invention, simply stated, are as follows:

(1) $Zn \rightarrow Zn^{++} + 2E$ (at anode)
(2) $MnO_2 + H_2O \rightarrow MnO + 2OH^-$ (at cathode)
(3) $Zn^{++} + 2OH^- \rightarrow ZnO + H_2O$ (at anode)

The over-all reaction therefore is:

(4) $Zn + MnO_2 \rightarrow ZnO + MnO$ (both products being considered insoluble).

It has been found that two paths are necessary in order for the system to function; namely, a path for electron flow from the anode to the cathode, and a path for the transfer of hydroxyl ions from the cathode to the anode. (The zinc ions stay by the donor zinc, and so the hydroxyl ions must come to them.)

The cathode or hydroxyl producing portion of this system is manganese dioxide (in Equation 2) which, when it receives electrons and if it is in contact with water, will take on electrons. In the process, the cathode valency is changed, and oxygen ions are liberated, which react with the water present to give negatively charged hydroxyl ions. However, since manganese dioxide is a very poor electron conductor, if electrons are introduced at only one spot on a large chunk, only the material around that contact point comes into the reaction. A very large surface area of the manganese dioxide must be in contact with electrolyte since it is only at this surface area that water is available to enter into the reaction, and a carrier is available to carry off the ions as they are produced. These requirements dictate that the manganese dioxide be available in the form of small particles.

It has been observed that since the cathode is not one large unit which is easily contacted electronically; but is, rather, a composite of very small cathodes, each of these must be linked to the anode by continuous ion and electron paths.

In accordance with the invention, an electron path is provided by mixing in with the manganese dioxide, particles of some inert, electronically conductive fibres or powder such as iron, graphite or carbon in such a way that each particle of manganese dioxide is in contact with a continuous path back to a common electron collector electrode.

The ion path is provided by mixing in with the manganese dioxide and the conductive material some hydroxyl containing electrolyte such as KOH solution. Once again each particle of manganese must be contacted, and a continuous path from each particle to the zinc assured. The various materials which are blended together to form the cathode are called a "mix."

It has been observed also, in accord with the present invention, that the internal electrical resistance of the cell must be kept at a minimum; otherwise, its useful voltage will be depressed and its energy will be expended uselessly in the form of heat. The requirement of very low cathode resistance dictates certain properties in connection with the mix and the manner in which it is prepared and formed. In its loose state, the particle to particle contact of its electron carrying components is poor, and the cumulative contact resistance is high. Tightly packed, the particle contact is improved and the mix resistance becomes low. Additionally, the mix must be firmly packed against an inert electrode, and held there so that at least one cathode contact point is available for external connection.

Figure 2:
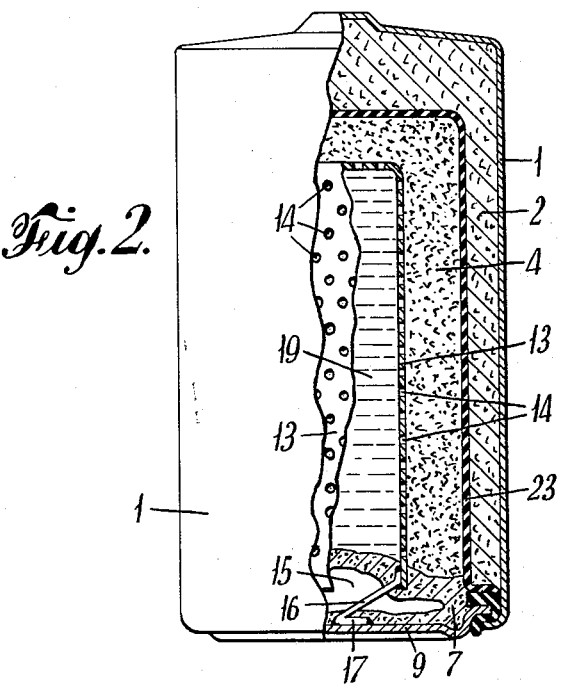
Fig. 2 is a front elevational view, partly in section, of a cell of the invention, equipped with an electrolyte reservoir.
Figure 3:
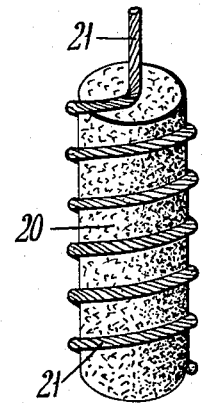
Fig. 3 is a side view of an electrolyte core suitable for use in the cell of Fig. 2.

Typical cells embodying the teachings of this invention are shown with modifications in each of Figs. 1, 2 and 3, and comprise an outer drawn steel can container 1 serving as a cathode current collector; a cathode 2 consisting of manganese dioxide, graphite and electrically conductive filamentary particles such as iron and steel wool, graphite-coated fibers and mixtures of the foregoing. This cathode is disclosed in greater detail, and claimed in the co-pending application of P. A. Marsal, A. Tasch and L. F. Urry, Serial No. 689,085, filed October 9, 1957. Also suitable for use in the cell of the invention are cement-bonded cathodes of the type disclosed and claimed in the co-pending application of K. Kordesch, Serial No. 689,082, filed October 9, 1957.

An ionically-permeable separator, shown at 3, is provided in the cell, in contact with the cathode wall 2. One edge of the separator is folded inward so that when a cardboard disc 10 is placed, an effective seal is provided against the migration of anode or cathode particles. The separator may also comprise two wraps of Viskon-vinyon paper, each about 0.008 inch thick.

Disc 11 is of a selectively permeable material which will transmit the various gases, hydrogen for instance, such as may be undesirably generated within the cell under certain conditions. This membrane, an example of which is a kraft paper coated with 0.0005 inch of polyethylene, passes no liquid and very little moisture vapor, but relatively copious volumes of various gases. Such gases as filter through disc 11 are harmlessly vented out the vent hole 12.

Shown by reference character 4 is a zinc powder-gel anode. Its composition is:

| Material: | Grams |
| --- | --- |
| Zinc powder | 200 |
| Sodium carboxy methyl cellulose (high viscosity) | 13.51 |
| Mercury | 8.33 |
| KOH solution, 9 normal | 205.7 |
| Octyl alcohol | 1.96 |

The octyl alcohol referred to in the above formulation is one of a number of additives which has been found to prevent creepage and diminish corrosion. N-decyl alcohol and octa-decyl chloride are also useful for this purpose, as well as many other aliphatic and aromatic alcohols, amines and chlorides having the following characteristics: polar structure of the molecule, ability to change the surface tension of alkaline electrolyte, low solubility in alkaline solutions, absence of reaction with zinc or caustic, and inertness toward depolarizers. Generally about 1 percent of the additive in the electrolyte gel is sufficient.

In assembling the cell, a quantity of anode gel, for example 33 grams in the case of "D"-size round cell, is next dispensed into the central cavity. This operation is facilitated by heating the cell and the anode gel to approximately 100° C. After placing a temporary cover over the open end of the cell to prevent the anode gel being thrown out, the cell is centrifuged on its vertical axis at a speed of about 3000 r.p.m. to obtain non-uniform distribution of the anodic material. The length of time of centrifuging will be a function of various factors, such as the rate at which the cell cools, but in general will be on the order of 5 seconds to 1 minute. Following the centrifuging operation, the central cavity of the cell which serves as an electrolyte reservoir is filled with gelled KOH electrolyte. The following formulation is satisfactory for this purpose

| Material: | Grams |
| --- | --- |
| KOH solution, 9 normal | 205.7 |
| Sodium carboxy methyl cellulose—high viscosity | 13.51 |
| Octyl alcohol | 1.96 |

As an alternate method, the reservoir gel and the zinc-bearing anode gel may be combined and the central cavity inside separator 3 filled to a proper level as shown in Fig. 1. In this case the cell closure may be completed before centrifuging. Even under these conditions, it is found that the centrifuging operation moves the zinc powder particles outward with maximum concentration adjacent to the separator where optimum utilization is obtained.

Another anode construction which performs excellently in the cell of this invention is a two-part anode system wherein distribution of zinc particles is non-uniform, being greater on the side nearer the cathode. Such a structure is disclosed and claimed in the co-pending application of E. E. Leger, Serial No. 689,086, filed October 9, 1957.

The anode collector electrode 5 shown in Fig. 1 is composed of amalgamated copper wire of about No. 20 gauge or amalgamated tinned steel wire of about No. 20 gauge. It is secured to steel closure 9 by welding or soldering. The excellent electrical conductivity of the zinc powder-gel mixture makes it possible to use this single wire collector electrode. Before the closure 9 is placed on the cell, an inner seal 7 of microcrystalline wax or asphalt is poured in to prevent air access to the anode gel. The neoprene washer 8 serves several purposes. It provides electrical insulation between the anode and cathode of the cell; it serves as a sealing gasket; and with the cooperation of the spun-over edge of the can maintains the cathode mix body 2 under compression.

In Fig. 2 is illustrated a modification of the invention wherein a special reservoir of electrolyte 19 is provided for the anode, in order that, as the cell discharges, the expanding zinc oxide may squeeze the reservoir thereby ejecting liquid to compensate for that absorbed and retained by the zinc oxide. Identified by reference character 13, the reservoir may consist of a perforated metal can or of a metal-wound tube of electrolyte-permeable material such as Viskon-vinyon paper. A plurality of openings 14 are provided in the reservoir to ensure rapid liquid travel as well as to permit expansion of solid anode material into a chamber 15. A metal connector strip 16 extends from the reservoir to the bottom cover 9, and is secured thereto by means of a solder joint 17. An insulator 23 separates the positive electrode 1 from the negative electrode 2, and assists in venting the cell. The reservoir is preferably positioned on the side of the anode away from the cathode. By so doing it is possible to have a minimum separator thickness and a dimensionally stable separator.

In the modification of Fig. 3, the electrolyte 19, instead of simply being in the reservoir in gel form, may be present in a core 20 composed of material having liquid-retentive properties, such as blotting paper, cellulose sponge or nitrocellulose sponge. A metal wire (21) wound around the core serves as a current collector in making contact with the surrounding anode.

In Figs. 4 and 5 are shown a modification of the invention particularly suitable for heavy duty. Here the cathode 2 is formed by molding a cathode mix of the composition previously described about a sleeve or cylinder 25 consisting of an iron screen or of expanded iron. In assembling the cell, negative metallic cover 9 is secured to plastic cell container 26 by curling the plastic material under the cover. Secured to the negative cover are anode collectors 5. Zinc paste is next placed in container 26. Cathode 2, wrapped with a separator 3, is inserted in the cell, and attached to the positive cover 6 by spot welding the cathode collector grid to the positive cover 6.

The cell of Fig. 6 is provided with a selective venting construction. This entails the placing of a selective barrier element which permits passage of gas, but excludes liquid. For this purpose a washer 27 of polyethylene, vinyl rubber and the like is well suited. As shown in Fig. 6, the washer is employed in connection with air space 28 having an opening 29 to the exterior. In the same embodiment the necessity for an additional current collector is obviated by bringing the anode paste 4 in contact with a tin-plated cover 9.

In the embodiment of the invention shown in Fig. 7 a grid-like perforated metal sleeve 30 is employed to confine the cathode material 2 to a defined space, so that the original conditions of high packing and good mix conductivity are retained. An advantage of this construction is that by controlling the grid hole size, the hydroxyl ion diffusion rate can be controlled, and the discharge curve flattened, resulting in more hours of service to a fixed voltage end point.

An entirely new order of performance can be obtained from cells made in accordance with the present invention, as will be seen from the following comparisons.

Flashlight lamps rated at 1.25 amperes at 4.5 volts were powered by four series connected "D"-size cells of the type described herein. These lamps still glowed with good brilliance after 6 to 7 hours, whereas the same lamps powered by four "D"-size Le Clanche cells ceased glowing after 45 minutes to one hour. Two cell flashlights equipped with lamps rated 0.5 ampere at 2.4 volts were still of good brilliance after 20 to 24 hours service with the cells of the invention, whereas similar flashlights were completely out after 3 hours of service from Le Clanche cells. "D"-size cells made in accordance with the invention give four hours of continuous service on a 2.25 ohm load to an 0.75 volt endpoint at —20° F. By contrast, the standard Le Clanche cell does not operate under these load and temperature conditions. A "D"-size cell made according to the present invention was used as the "A" battery of a portable radio. The set stopped operating after 40 to 44 hours of continuous service at an "A" voltage of 0.87 to 0.88. Standard Le Clanche cells lasted from 6 to 8 hours with set failure taking place at 0.95 volt. The short circuit amperage of a typical dry cell is largely influenced by the ratio of manganese dioxide to carbon. When this ratio is 8 parts by weight of manganese dioxide to one of carbon, the flash amperage for a Le Clanche type "D"-size cell is usually of the order of 6 to 10 amperes. A comparable cell made in accordance with the present invention has a flash amperage of 25 to 30 amperes.

In an additional test four different brands of standard Le Clanche "D"-size cells were discharged on a one ohm load. None of these lasted as long as one hour to an 0.75 volt endpoint. A cell of the invention made with natural manganese dioxide gave six hours to this endpoint, and when made with electrolytically prepared manganese dioxide, gave 7¾ hours, the cell giving over four hours to a one volt endpoint.

On light loads, the alkaline cell made according to this invention outperforms the Le Clanche type due to the fact that the $MnO_2$ depolarizer will function to a lower state of reduction than it is able to in the acid Le Clanche system. An example of such improvement at light loading is as follows:

| Efficiency [1]: | Approx. load on "D"-size cell, ohms |
|---|---|
| 34% | 1 |
| 67 | 2.25 |
| 100 | 10.5 |

[1] Efficiency as based on operation to an end voltage of 0.75 volt, and reduction of natural $MnO_2$ to $Mn_3O_4$. Under even lighter load conditions, there is evidence that some of the $MnO_2$ is reduced all the way to MnO. In the Le Clanche system, reduction of the $MnO_2$ goes only to $Mn_2O_3$, thus lacking the capacity which is possible in the alkaline medium.

What is claimed is:

1. An alkaline dry cell comprising a container having a top closure, a depolarizing cathode in said container, an ionically permeable separator in contact with said cathode, a gelled anode insulated from said cathode by said separator and consisting of non-uniformly distributed anodic particles, together with alkaline electrolyte and a gelling agent, the concentration of said anodic particles being greater adjacent said separator, a metal bottom closure insulated from said cathode and current collecting means.

2. An alkaline dry cell comprising an open bottomed metal container serving as a cathode current collector, said container having an integral top closure having a central protuberance with a venting aperture therein, a gas-permeable, liquid-impermeable membrane composed of a material selected from the group consisting of polyethylene and vinyl rubber fitting in said container across the diameter thereof below said closure, a molded, tubular cathode fitting tightly in said container and consisting of manganese dioxide, graphite and conductive filamentary particles, an ionically-permeable separator in contact with said cathode, said separator having its top edge folded inwardly, a cardboard disc below said edge, a gelled anode insulated from said cathode by said separator, and consisting of finely divided zinc particles, alkaline electrolyte, a gelling agent, electrolyte-creepage inhibitors and mercury, the concentration of said zinc particles being greater adjacent said separator, a metal bottom closure insulated from said container and said cathode, and a metal anode collector secured to said bottom closure and extending in said gelled anode.

3. An alkaline dry cell comprising an open bottomed metallic container having an integral top closure, a cup-shaped depolarizing cathode fitting in said container, an ionically permeable separator contacting said cathode, a gelled anode consisting of zinc particles, viscous alkaline electrolyte, a gelling agent and mercury, the concentration of said zinc particles being greater adjacent said separator, an electrolyte-containing reservoir in contact with said anode, said reservoir consisting of a perforated metal, a metal bottom closure insulated from said cathode and said container, said closure being secured to said container, and a metal anode collector secured to said reservoir and said bottom closure.

4. The cell of claim 3 wherein said electrolyte reservoir consists of a metal-wound tube of electrolyte-permeable material.

5. The cell of claim 3 wherein said anode collector consists of a wire wound about an electrolyte-containing core composed of a liquid-retentive material selected from the group consisting of blotting paper, cellulose sponge and nitrocellulose sponge.

6. A heavy duty alkaline cell comprising an open bottomed metal container, a tubular depolarizing cathode fitting tightly in said container, a perforated metal sleeve contacting said cathode and coextensive therewith, the size of the perforations in said sleeve serving to control hydroxyl ion diffusion rate, an ionically-permeable separator in contact with said sleeve, a gelled anode insulated from said sleeve by said separator, and consisting of finely divided zinc particles, alkaline electrolyte, a gelling agent, electrolyte-creepage inhibitors and mercury, the concentration of said zinc particles being greater adjacent said separator, a metal bottom closure insulated from said container and said cathode, and a metal anode collector secured to said closure and extending in said gelled anode.

7. A heavy duty alkaline cell comprising a tubular plastic container having metallic top and bottom closures secured thereto, a separator-wrapped depolarizing cathode molded about a metallic cathode collector grid secured to said top closure, a gelled anode in said container consisting of finely divided zinc particles, an alkaline electrolyte, a gelling agent, electrolyte-creepage inhibitors and mercury, the concentration of said zinc particles being greater adjacent said cathode and an anode collector secured to said bottom closure.

References Cited in the file of this patent

UNITED STATES PATENTS

| 793,077 | Hubbell | June 27, 1905 |
| 2,433,024 | Burgess | Dec. 23, 1947 |
| 2,463,316 | Ruben | Mar. 1, 1949 |
| 2,650,945 | Herbert | Sept. 1, 1953 |
| 2,773,926 | Glover | Dec. 11, 1956 |

FOREIGN PATENTS

| 584,211 | Great Britain | Jan. 9, 1947 |